United States Patent
Kaufman et al.

(10) Patent No.: US 6,661,776 B1
(45) Date of Patent: Dec. 9, 2003

(54) METHOD FOR ESTIMATING THE PROCESSOR OCCUPANCY AND CALL CAPACITY OF BASE SITUATIONS

(75) Inventors: Joseph S. Kaufman, Holmdel, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/475,131

(22) Filed: Dec. 30, 1999

(51) Int. Cl.[7] ............ G01R 31/08; G06F 11/00; G08C 15/00; H04J 1/16; H04J 3/14
(52) U.S. Cl. .............. 370/234; 455/423; 455/453; 370/252; 370/331
(58) Field of Search ............... 370/328, 329, 370/331, 252, 443, 447, 462; 455/436–439, 510, 515, 423, 424, 453, 438; 702/57, 62, 147

(56) References Cited

U.S. PATENT DOCUMENTS

| | | | | |
|---|---|---|---|---|
| 4,670,899 A | * | 6/1987 | Brody et al. | 455/453 |
| 5,530,912 A | * | 6/1996 | Agrawal et al. | 455/450 |
| 5,548,533 A | * | 8/1996 | Gao et al. | 709/235 |
| 5,978,358 A | * | 11/1999 | Wang et al. | 370/234 |
| 6,173,175 B1 | * | 1/2001 | Alazma et al. | 455/423 |
| 6,459,902 B1 | * | 10/2002 | Li et al. | 455/453 |

* cited by examiner

Primary Examiner—Wellington Chin
Assistant Examiner—Yvonne Q. Ha (57) ABSTRACT

A method for predicting the percentage of real-time a processor in a base station is being utilized (i.e., processor occupancy) based only on calling rates, given measured call control event (i.e., origination, termination, handoff, paging, registration, and locate rates) data for the base station. Constant ratios between the various call control events and the calling rates (e.g., originations+terminations) are determined for the base station. Given the actual time spent by the processor on each type of call control event and the constant ratios, the processor occupancy is accurately predicted using call originations+terminations or call origination rates as variables. The processor occupancy may be fixed at some value (e.g., 90%) and the calling capacity of the base station (i.e., the total number of call originations and terminations which will result in such processor occupancy) is determined from the determined relationship between processor occupancy and calling rates. This allows estimation of the number of users a base station may support prior to reaching a high processor occupancy threshold.

21 Claims, 4 Drawing Sheets

FIG. 1

| TIME OF DAY | AMPS ORIGINATE | AMPS TERMINATE | TDMA ORIGINATE | TDMA TERMINATE | SELF LOCATE | AMPS HAND-OFFS IN | ... |
|---|---|---|---|---|---|---|---|
| 7am | 400 | 200 | 800 | 450 | 1000 | 100 | |
| 8am | 500 | 225 | 1000 | 520 | 1250 | 200 | |
| ... | ... | ... | ... | ... | ... | ... | |
| 11pm | 350 | 125 | 1200 | 560 | 1100 | 90 | |

METHOD FOR ESTIMATING THE PROCESSOR OCCUPANCY AND CALL CAPACITY OF BASE SITUATIONS

BACKGROUND OF THE INVENTION

1. Field of the Invention

The present invention relates to estimating the call capacity in wireless communication systems.

2. Description of the Related Art

Recent developments in wireless communication systems have focused on increasing the capacity of wireless radio links. While these advances allow more calls to be processed at each base station, they may produce a situation where the processing capacity of a base station, rather than the radio link capacity, limits overall system performance.

In wireless communication systems, call control functions are typically performed by a single processor located in a base station. These call control functions tend to be transient events involved with call setup and handoff. For example, these call control events include processes executed by the call control processor to enable setting up of a call, handing off a call from one base station to another, and releasing a call. The steady-state traffic signals involved with a call-in-progress are not considered call control functions.

It is common to define "processor occupancy" as the fraction of time a processor is busy. For example, if the processor is busy performing operations for N seconds out of a T second period, the processor occupancy (expressed in percent) is $(N/T) * 100$.

The processor occupancy can be thought of as consisting of three components: no-load occupancy; call control processor occupancy and the occupancy due to operations; administration and maintenance (O, A & M). Of course, all processors have overhead associated with running the operating system, transferring data, etc. Thus, it is useful to define "no-load processor occupancy" as the processor occupancy that is not directly a result of call processing tasks. In other words, the no-load processor occupancy is the processor occupancy when no calls are being processed (i.e., under a so-called no-load condition). Similarly, "call control processor occupancy" is defined as the processor occupancy due to the above-described call control functions.

"O, A & M processor occupancy" is defined as the processor occupancy due to the O, A & M functions. Because of the real time needs of call control functions, the operating system in the processor is typically preemptive with static or dynamic priorities, meaning that certain events must wait until other, higher priority events execute. Processes that execute O, A & M functions are assigned priorities lower than those assigned to call control processes, because O, A & M tasks typically have loose delay requirements, meaning that these tasks may be delayed a relatively long time. Processes that are responsible for operating system specific functions and which contribute to no-load occupancy have extremely tight delay requirements and are assigned priorities higher than those assigned to call control processes. As a consequence of the preemptive nature of the operating system, O, A & M processes cannot execute whenever there is any operating system (i.e., no-load) or call control processes that are runnable.

Therefore, from the point of view of call control functions, the relevant occupancy components that contribute to call processing delays are those due to no-load and call control. Thus, in subsequent discussions, "total processor occupancy" will be understood to be the sum of no-load processor occupancy and call control processor occupancy. The call control processor occupancy may be calculated if the set of all call control events, their rates, and their respective processing times is determined.

Typical call control events which contribute to the processor occupancy of a base station will now be discussed. For the purposes of discussion and for ease of description, advanced mobile phone service (AMPS) and time division multiplex access (TDMA) call control events will be primarily described. However, the following call control events are generic and intended to be representative of like events in other systems, and of like events in different AMPS and TDMA implementations from different manufacturers. All of the following call control events contribute to the processor occupancy of a base station, each call control event having an associated processing time Call events may be grouped into the following eight categories, for the purposes of description: mobile originations, mobile terminations, call release, handoffs out of a base station, handoffs into a base station, pages, registrations, and locates. These eight general categories will now be more specifically described.

The phrase mobile originations refers to calls originated by a mobile unit. This call event includes all of the messages involved in setting up a call. For example, this event typically includes messaging to and from the base station which detects a call attempt, messaging to and from the mobile switching center (MSC) which may determine the channel to be assigned and messaging to and from the mobile which results in the mobile tuning to the assigned channel.

The phrase mobile terminations refers to calls originated in the PSTN and terminating at a mobile unit. This call event includes all of the messages involved in establishing such a call.

Call release, the ending of a call, may be either mobile-initiated or forced by the MSC.

Handoffs out of a base station occur when a mobile served by a base station moves into an area better served by another base station. Handoffs into a base station occur when a mobile moves into the area better served by the base station. Both of these handoff events are included when calculating the processor occupancy.

Pages are messages transmitted from a base station to all mobile stations within its coverage area (i.e., cell).

Autonomous registrations for AMPS and TDMA systems occur when a mobile unit "announces" its presence to the nearest base station (and thus to the MSC). Once this presence has been registered with the base station's MSC (and with the mobile unit's home area MSC, if applicable), mobile terminated calls can find the particular mobile unit for which they are intended.

The final class of call control events are those used in the coordination of measurement activity prior to handoffs, generically referred to as locate events. Such locates are typically used to find the best cell, and/or antenna face within a cell, to serve an existing call. Locate events may be generated within the cell (Self Locate) or received from neighbor cells (Neighbor Locate Requests Received). Locate events occur in both AMPS and TDMA systems, though the manner in which they occur is different between these systems Having thus defined several classes of call control events, the processing time for each event may be measured for a particular processor, and for both AMPS and TDMA systems. The measurement times include only the actual processing time spent, and do not include elapsed time spent waiting for responses (either from the mobile unit or the MSC). These measurements may be single thread (single call) measurements made in an unloaded system using a measurement tool suited for such a purpose.

Figure 1:
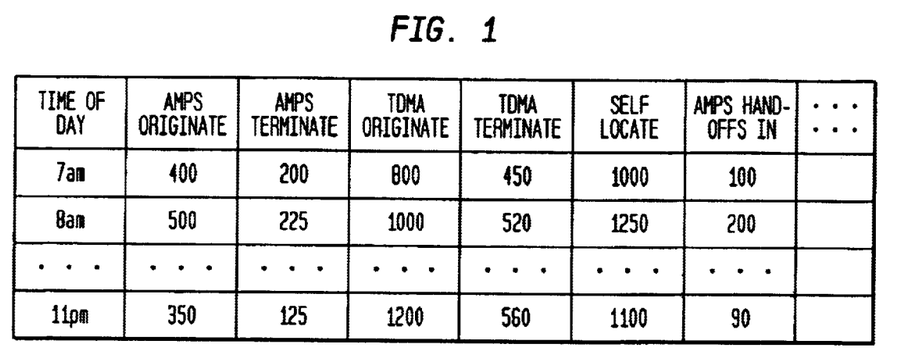
FIG. 1 is an example of service measurement counts collected at the base station.

Call processing times may change with the addition of features in a particular system, and with each new software release for the system. Hence, measuring these processing times for each new release/feature may be made part of the standard laboratory testing program In both AMPS and TDMA systems, when a specified call control event occurs a counter may be incremented. The number thus accumulated may be used to calculate the rates of the above-described call control events. Such counts are known in the wireless art, and detailed descriptions of these counts will vary between manufacturers of wireless systems. An example of call control event counts totaled on an hourly basis is shown in FIG. 1.

Once the processing time of each call control event is known, and the count (i.e., # of a particular call control event per unit time, such as an hour) is measured, the processor occupancy as a percentage may be calculated for that particular call control event. The call control processor occupancy determined from a sum of processor occupancies for the relevant call control events can be verified by measuring the (total) call control processor occupancy directly using various different methods. For example, the operating system in the base station may provide hourly counts which are relatable to total processor occupancy.

As stated above, the total processor occupancy may be estimated by summing the processor occupancy for each call control event (e.g., originations, terminations, handoffs, etc.) and the no-load processor occupancy. The processor occupancy for each call control event is obtained by multiplying the real-time used per occurrence of that event and the number of occurrences of that component during the hour (e.g., determined from the count for that call control event). For example, to obtain the real-time spent on AMPS call originations during an hour, one would multiply the number of AMPS originations for the cell during the hour (from the count for AMPS originations) by the AMPS call origination processing time.

The total processor occupancy estimate in % may be written as:

$$\hat{\rho} = \rho_{nl} + \alpha \times (\Sigma_i \beta_i^A N_i^A + \Sigma_j \beta_j^T N_j^T) \times 100 \qquad (1)$$

where:

$\hat{\rho}$ is the estimated total processor occupancy expressed as the percentage of time that the processor is busy with call processing tasks and no-load activity.

$\rho_{nl}$ is the no-load processor occupancy expressed as the percentage of time that the processor is busy with non-call processing related tasks. The no-load processor occupancy, $\rho_{nl}$, can be evaluated by measuring processor occupancy when the call volume is low (e.g., in the pre-dawn hours).

$\alpha$ is a scale factor used to obtain consistent units in the occupancy calculation.

$\beta_i^A$ is the processing time for the ith AMPS call processing event, and i is an index that runs over all AMPS call processing events.

$N_i^A$ is the number of occurrences per unit time of the ith AMPS call processing event, and is obtained from the appropriate count.

$\beta_j^T$ is the processing time for the jth TDMA call processing event, and j is an index that runs over all TDMA call processing events.

$N_j^T$ is the number of occurrences per unit time of the jth TDMA call processing event, and is obtained from the appropriate count.

The above equation is valid for dual-mode AMPS and TDMA base stations. If the base station is AMPS or TDMA only, then the second or first summation term, respectively, will be zero. No other change to Equation 1 is necessary to handle single mode base stations.

Figure 2:
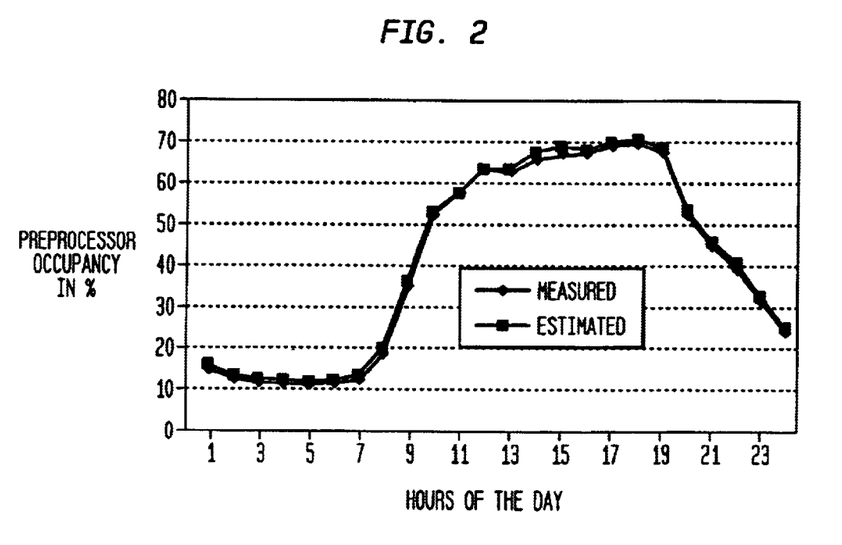
FIG. 2 illustrates estimated and measured processor occupancy for a dual mode AMPS and TDMA base station.

FIG. 2 shows both the estimated processor occupancy (from Eqn. 1) and the directly measured processor occupancy counts in a base station versus the hour of the day for a 24 hour duration. It may be observed that the Equation 1 estimator is very accurate.

It is desirable among providers of wireless service to determine the call capacity of a base station for planning purposes This "call capacity" is defined as the maximum calling rate (in terms of originations+terminations per hour or alternatively originations per hour) which results in a processor occupancy of $\rho_{max}$. For the purposes of explanation, $\rho_{max}$ may correspond to the processor occupancy at which base station call setup delays are excessive. Service providers typically desire to know at what call capacity a processor occupancy of $\rho_{max}$ will be reached, because such a call capacity is directly related to available revenue per base station, as well as useful for determining when to upgrade the processor and/or split the cell. Thus, call capacity prediction based on originations+terminations per hour or originations per hour would be valuable.

Likewise, it is also desirable to predict various call control event rates, such as handoffs in or out of a base station, (also in terms of originations+terminations per hour or alternatively originations per hour) for use in system engineering of wireless communication systems. In such a case, engineering tradeoffs between the signal strength thresholds at which locates occur and processor capacity could be made. Prediction of handoff rates based of originations+terminations per hour or originations per hour would also be valuable.

The use of two alternate variables (i.e., originations+ terminations and originations) may be due to the pricing structures of different service providers. For example, United States service providers may charge users for calls originated and received at a mobile unit, and are hence interested in the former metric. European service providers, by contrast, may charge users only for calls originated at a mobile unit, and are hence interested in the latter metric.

However, the occupancy estimation Equation 1 is not amenable to either capacity estimation or call control event prediction, because it depends on a large number of call processing events. Such a large number of variables is ill-suited for estimating the call capacity which will result in a processor occupancy $\rho_{max}$. Nor can individual call processing event rates (e.g., handoffs) be predicted from Equation 1.

SUMMARY OF THE INVENTION

The present invention provides a method for predicting the percentage of time a processor in a base station is being utilized (i.e., processor occupancy) based on calling rates, given measured call control event data (e.g., origination, termination, handoff, paging, registration, and locate rates) for the base station. Constant ratios between the various call control events and the calling rates (e.g., originations+ terminations) are determined for a base station. Given the actual time spent by the processor on each type of call control event and the constant ratios, the processor occupancy may be accurately predicted using call originations+ terminations or call origination rates as variables.

In one embodiment of the present invention, the processor occupancy is fixed at some maximum allowable value and the call capacity of the base station (e.g., the total number of call originations and terminations which will result in that maximum processor occupancy) is determined from the relationship between processor occupancy and calling rates. This allows estimation of the number of users a base station may support prior to reaching a high processor occupancy threshold. For deployed base stations, a "snap shot" of current field data is used to compute the above constant ratios and validate their accuracy in processor occupancy estimation. Use of such data is feasible, because call volume typically grows relatively slowly, enabling use of data from a base station which is currently at, for example, 40–50% occupancy to predict the call volume at which the maximum allowable processor occupancy will be reached (i.e., the call capacity) in many months or several years. For base stations yet to be deployed, the above relationship enables coarse estimates of the calling capacity given some assumptions about the operating environment. Hence, the invention enables estimation of the call capacity for both base stations currently in use, and base stations yet to be deployed. Such predictions are very valuable for system planning purposes.

In another embodiment of the present invention, the handoff rate, the paging rate, the registration rate, or the locate rate is determined based only on the calling rate. This allows engineering tradeoffs between, for example, the available calling rate for a base station and corresponding handoff or locate thresholds.

DETAILED DESCRIPTION OF THE INVENTION

In one aspect of the invention, processor occupancy Equation 1 is transformed (by computing the constant ratios) into another equation with only the calling rate as a variable. This form of the processor occupancy equation is amenable to calculating the call capacity.

As noted above, Equation 1 is not amenable to calling capacity estimation, because it depends on a large number of call processing events (i.e., variables). If the occupancy estimation equation is transformed to just one variable, i.e., the number of call originations+terminations, then capacity can be readily computed. Of course, such a transformation will only be valuable as an estimator or predictor if it maintains the accuracy when compared to real data shown above for Equation 1. To obtain this objective of readily computed and accurate call capacity estimation, an approach to call capacity estimation given processor occupancy according to one aspect of the invention will first be described. Then a method for expressing certain call processing events as a function of the calling rate according to other aspects of the invention will be described. Finally, a modified form of the processor occupancy estimation Equation 1 incorporating the key processing events according to another aspect of the invention will be described. This modified processor occupancy will be shown to be accurate and suited for call capacity calculations.

Call Capacity Estimation

The approach to calling capacity estimation is best illustrated through a consideration of an AMPS-only system. For AMPS, the processor occupancy estimator Equation 1 may be expressed as:

$$\hat{\rho}=f(c_O,c_T,h_{in},h_{out},l_S,l_N,p,ar)+\rho_{nl} \quad (2)$$

where $\hat{\rho}$ is the estimated processor occupancy;

$c_O$ is the number of call originations per hour;

$c_T$ is the number of call terminations per hour;

$h_{in}$ is the number of incoming (target cell) handoffs per hour;

$h_{out}$ is the number of outgoing (requesting cell) handoffs per hour;

$l_S$ is the number of self locates per hour;

$l_N$ is the number of neighbor locates per hour;

p is the number of pages per hour;

ar is the number of autonomous registrations per hour;

f represents the linear function (from Equation 1) that relates the above call processing events (all of which may be obtained from appropriate counts) to the processor occupancy; and $\rho_{nl}$ is the no-load processor occupancy;

Also, a composite calling variable is defined as the sum of call originations and terminations:

$$\tilde{c}=c_O+c_T. \quad (3)$$

Thus, Equation 3 reduces the number of variables in the f(.) term of Equation 2 by one.

Calling capacity may be defined in two alternative ways: 1) as the number of call originations, $c_{max,O}$, at which the processor occupancy becomes $\rho_{max}$, or 2) as the number of originations and terminations, $\tilde{c}_{max}=c_{max,O}+c_{max,T}$, at which $\rho_{max}$ is reached. These two measures may be related by expressing the number of call terminations as a scalar multiple of the number of call originations in the estimation equation. It is possible to relate originations $c_O$ to terminations $c_T$, because the ratio of the number of call terminations $c_T$ to the number of call originations $c_O$ is typically quite stable for a given base station (and more generally for a given MSC).

The remaining variables in the f(.) term of Equation 2, $h_{in}$, $h_{out}$, $l_S$, $l_N$, p and ar are related to the total number of originations+terminations, $\tilde{c}$, as described in the sections that follow. With the above simplifications and expression of call control events in terms of $\tilde{c}$, the processor occupancy estimate can be written as a function of originations+terminations $\tilde{c}$, and the no-load occupancy $\rho_{nl}$, as follows:

$$\hat{\rho} = g(\tilde{c}, \rho_{nl}) \quad (4)$$

where the function $g(.)$, is derived from the function $f(.)$ using the aforementioned simplifications and substitutions. In fact $g(.)$ is a linear function of $\tilde{c}$ with the no-load term appearing as a constant. That is, the estimation Equation 4 reduces to the form:

$$\hat{\rho} = T_1 \times \tilde{c} + T_2. \quad (5)$$

$T_1$, and $T_2$ are constants that depend on the processor processing times for the different call processing events and other constant ratios (to be defined in the following sections) obtained through data analysis. Using this form of the estimator equation, call capacity in terms of mobile originations+terminations, $\tilde{c}_{max}$, is obtained by setting $\hat{\rho} = \rho_{max}$ and solving for $\tilde{c}_{max}$:

$$\tilde{c}_{max} = \frac{\rho_{max} - T_2}{T_1} \quad (6)$$

Thus, Equation 6 expresses calling capacity in the second of the two ways noted above (i.e., the number of originations and terminations, $\tilde{c}_{max} = c_{max,O} + c_{max,T}$, at which $\rho_{max}$ is reached).

To express calling capacity in the first of the two ways noted above (i.e., the number of call originations, $c_{max,O}$, at which the processor occupancy becomes $\rho_{max}$), Equation 5 must be modified using the above-noted constant ratio between call originations $c_O$ and call terminations $c_T$. Hence, $c_T$ is expressed as a base station-specific constant, $K_{term}$, multiplied by $c_O$. With this substitution, the estimation Equation 5 may be equivalently written as:

$$\hat{\rho} = S_1 \times c_O + S_2 \quad (7)$$

where $S_1$ and $S_2$ are constants related to $T_1$ and $T_2$ through the constant $K_{term}$. Call capacity in terms of originations only, $c_{max,O}$, is obtained by setting $\hat{\rho} = \rho_{max}$ in Eqn. 7 and solving for $c_{max,O}$:

$$c_{max,O} = \frac{\rho_{max} - S_2}{S_1} \quad (8)$$

Thus, Equations 6 and 8 provide expressions for the call capacity of a base station expressed in terms of call orginations+terminations and call originations, respectively. This call capacity estimation approach relies on the locate, handoff, paging and registration events, $l_S$, $l_N$, $h_{in}$, $h_{out}$, p and ar each being expressed as the product of a constant and $\tilde{c}$ (or $c_O$). Though illustrated above with reference to AMPS systems for ease of description and explanation, this call capacity estimation approach is applicable for AMPS, TDMA and dual-mode AMPS/TDMA cells via the addition of TDMA-specific terms and the relation thereof to $\tilde{c}$ (or $c_O$).

The following sections detail the relationship between the locate, handoff, paging and registration events, $l_S$, $l_N$, $h_{in}$, $h_{out}$, p and ar respectively, and calling rates. Both AMPS and TDMA systems will be discussed. In the sections that follow, subscripts "A" and "T" denote AMPS and TDMA respectively. Though the following description may be specific to a particular AMPS or TDMA implementation, the instant invention covers the measurement and quantification of constant relationships among other "handoff" and "locate" implementations and calling rates $\tilde{c}$ (or $c_O$) Handoffs will be discussed first.

Handoffs in AMPS and TDMA

One embodiment of the invention includes a method for expressing the number of incoming handoffs, $h_{in}$, and outgoing handoffs, $h_{out}$, as a function of the number of originations+terminations, $\tilde{c} = (c_O + c_T)$.

Regarding handoffs out of a base station $h_{out}$, it has been discovered and verified that the number of handoff requests generated per call (averaged over an hour or some other suitable period of time) is roughly constant during busy (i.e., highest numbers of calls) hours. So the number of outgoing handoffs $h_{out}$ may be accurately expressed as the product of a constant $K_{out,A}$ and the total number of carried calls $(c_O + c_T + h_{in})$.

Figure 3:
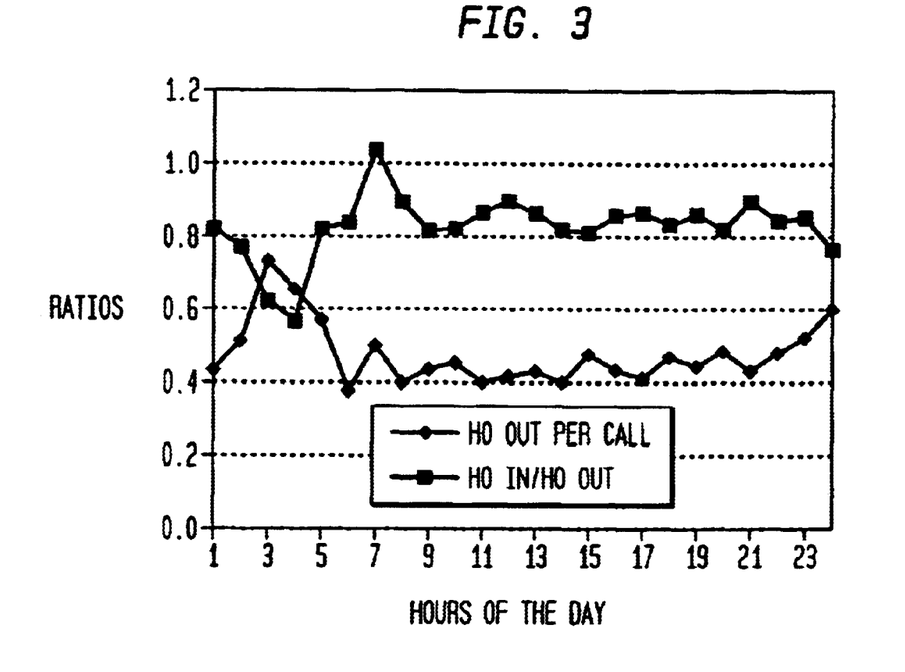
FIG. 3 illustrates $K_{in,A}$ (ratio of number of incoming AMPS handoffs to outgoing AMPS handoffs) and $K_{out,A}$ (the ratio of outgoing AMPS handoffs to number of AMPS originations, terminations and incoming handoffs) as a function of time for a typical base station.

The lower plot in FIG. 3 illustrates $K_{out,A}$, the ratio of outgoing AMPS handoffs $h_{out}$ to number of AMPS originations, terminations and incoming handoffs $(c_O + c_T + h_{in})$ as a function of time for a typical base station. This ratio $K_{out,A}$ is also conveniently thought of as the number of outgoing handoffs (HO) per call handled by the base station. FIG. 3 illustrates that $K_{out,A}$ remains nearly constant throughout the busiest period (i.e., highest number of calls) of the day, and fluctuates in the early morning and late night periods (i.e., hours 22 through 6), when the call volume is very low. Hence, $K_{out,A}$ may be approximated as a constant for purposes of processor occupancy, because the approximation need only be accurate for relatively high processor occupancy (e.g., 40–90%) which occurs during the busier parts of the day.

In estimating the number of incoming handoffs, $h_{in}$, the following conceptual problem initially appears. The number of incoming handoffs depends on traffic from other (neighboring) base stations, which are not necessarily relatable to the base station of interest. However, upon further consideration, if the call load in a cell and its neighbors are highly correlated, then the number of handoffs coming in to the cell should be highly correlated with the number of handoffs leaving the cell. Upon investigation of this correlation theory, it was discovered that the ratio of the number of incoming handoffs, $h_{in}$, to the number of outgoing handoffs, $h_{out}$, is very stable (i.e., nearly constant) during the busy hours on cells with moderate to heavy load.

The upper plot in FIG. 3 illustrates $K_{in,A}$, the ratio of incoming AMPS handoffs $h_{in}$ to the number of outgoing AMPS handoffs $h_{out}$, as a function of time for a typical base station. FIG. 3 illustrates that $K_{in,A}$ remains nearly constant throughout the busiest period (i.e., highest number of calls) of the day. As noted above, it is this "busy" time which is of interest for processor occupancy and calling capacity estimation/prediction purposes.

The above analysis may be quantified using the following notation:

$h_{in}$ is the number of incoming (target cell) AMPS handoffs;

$h_{out,A}$ is the number of outgoing (requesting cell) AMPS handoffs;

$K_{in,A}$ is the ratio of number of incoming AMPS handoffs to outgoing AMPS handoffs;

$K_{out,A}$ is the ratio of outgoing AMPS handoffs to number of AMPS originations+terminations+incoming handoffs (which is the number of carried calls);

$h_{in,T}$ is the number of incoming TDMA handoffs;

$h_{out,T}$ is the number of outgoing TDMA handoffs;

$K_{in,T}$ is the ratio of number of incoming TDMA handoffs to outgoing TDMA handoffs; and $K_{out,T}$ is the ratio of outgoing TDMA handoffs to number of TDMA originations+terminations+incoming handoffs.

Based on these definitions, the estimated number of incoming and outgoing handoffs, $\hat{h}_{in,A}$ and $\hat{h}_{out,A}$ respectively, for an AMPS system or an AMPS portion of a dual mode system are given by the following equations:

$$\hat{h}_{out,A} = K_{out,A} \times (c_{O,A} + c_{T,A} + \hat{h}_{in,A})$$

$$\hat{h}_{in,A} = K_{in,A} \times \hat{h}_{out,A} \qquad (9)$$

where $K_{in,A}$ and $K_{out,A}$ are constants evaluated through busy-hour field data analysis. This pair of simultaneous equations 9 are then solved to yield estimates of handoffs into and handoffs out of a base station $\hat{h}_{in,A}$ and $\hat{h}_{out,A}$ expressed in terms of the number of AMPS call originations and call terminations.

$$\hat{h}_{out,A} = \frac{K_{out,A}}{1 - K_{out,A} K_{in,A}} \times (c_{O,A} + c_{T,A}) = \frac{K_{out,A}}{1 - K_{out,A} K_{in,A}} \times \tilde{c}_A \qquad (10)$$

and $$\hat{h}_{in,A} = \frac{K_{out,A} K_{in,A}}{1 - K_{out,A} K_{in,A}} \times (c_{O,A} + c_{T,A}) = \frac{K_{out,A} K_{in,A}}{1 - K_{out,A} K_{in,A}} \times \tilde{c}_A,$$

where the total number of AMPS call events equals the number of originations added to the number of terminations over a period of time $\tilde{c}_A = c_{O,A} + c_{T,A}$. If the calling capacity estimate is to be only in terms of the number of call originations as in Equation 8, then one can further reduce these Equations 10 to functions of $c_{O,A}$, by expressing $c_{T,A}$ as a function of $c_{O,A}$:

$$c_{T,A} = K_{term,A} \times c_{O,A} \qquad (11)$$

where $K_{term,A}$ is the ratio of the average number of AMPS terminating calls to the average number of AMPS originating calls. $K_{term,A}$ is constant for a given base station, and it may be determined through data analysis of suitable counts.

Similar relationships to those above in Equations 10 and 11 hold for TDMA handoffs. The subscripts merely change from A to T, for example $K_{in,T}$ and $K_{out,T}$, indicating a TDMA system. The fact that $K_{in,T}$ and $K_{out,T}$ are approximately constant for a given base station during the busy hours was verified through analysis of measured field data. FIG. 3 is also representative of the shape, but not necessarily the numerical values for $K_{in,T}$ and $K_{out,T}$.

As noted above, during the pre-dawn hours there is more variability in the ratios because the calling rate is very low. For the purposes of call capacity estimation, only the values during the busy hours are of interest, and these ratios are computed individually for each cell through data analysis.

Self Locates in AMPS

Figure 4:
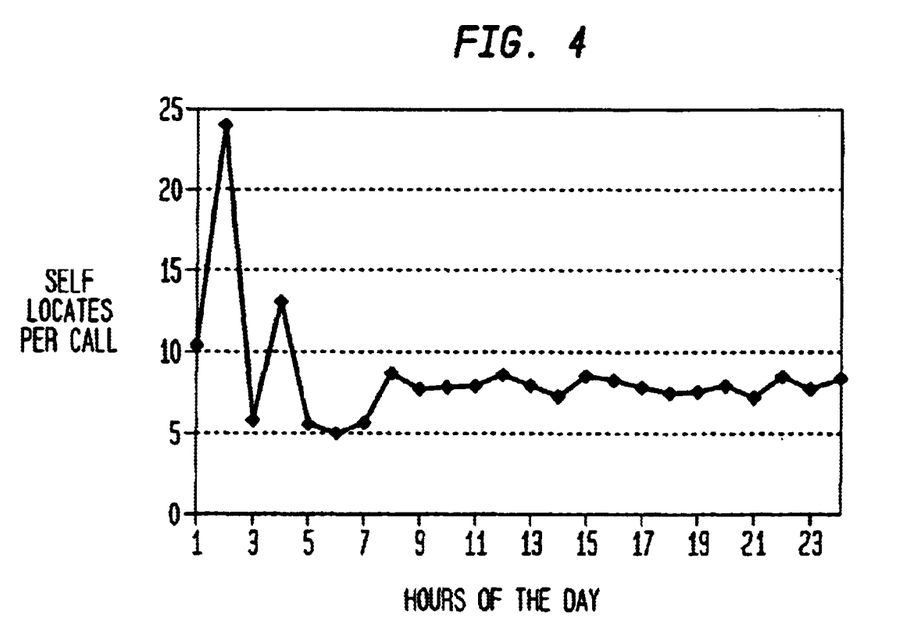
FIG. 4 illustrates an average number of self locates per call versus hour of day for a typical base station.

Self locates are uplink signal measurement processing events that are generated within the cell served by the processing base station. They are used to determine if a call in progress is served with better quality on a different antenna face within the same cell. It has been determined through empirical analysis that for a given AMPS-providing base station, self locates $l_S$ may be accurately expressed as a constant $K_S$ multiplied by the total number of carried calls ($\tilde{c}_A + h_{in,A}$). FIG. 4 is a plot of the average number of self locates per call, shown over a 24 hour day for a typical base station. In this plot, hour 1 corresponds to 1 AM. As may be seen, during the pre dawn hours (1 AM–5AM), there were some instances of the ratio between self locates and calls being unusually large. Of course, the number of calls during these periods was extremely small and not representative of typical values. Therefore, this constant relationship holds for the period 7 AM–10 PM, which is the period of interest when calling rates are high.

The number of self locates per call varies from cell to cell within a market as well as from market to market. Hence, using a single value for all cells is unlikely to yield sufficiently accurate processor occupancy estimates. The number of self locates per call, although quite variable across cells and markets, displays remarkable stability for each cell over the busy hours as shown in FIG. 4. Thus, to estimate occupancy due to self-locates for a given base station, the number of self locates is expressed as the product of a cell-specific constant and the number of calls carried ($\tilde{c}_A + h_{in,A}$). That is, the estimated number of self locates, $\hat{l}_S$, can be written as:

$$\hat{l}_S = K_S \times (\tilde{c}_A + h_{in,A}) \qquad (12)$$

where $K_S$ is a constant that represents the number of self locates per call during the busy hour. By substituting Equation 10 for $\hat{h}_{in,A}$ in place of $h_{in,A}$ in Equation 12, the estimate may be written completely as a function of $\tilde{c}_A$, or alternatively $c_{O,A}$, as:

$$\hat{l}_S = \frac{K_S}{1 - K_{in,A} K_{out,A}} \times \tilde{c}_A = \frac{K_S}{1 - K_{in,A} K_{out,A}} (1 + K_{term,A}) \times c_{O,A} \qquad (13)$$

$K_S$ is cell-specific and must be determined through data analysis for the best accuracy. Through the data analysis described above, $K_S$ can be computed for each cell, and hence the number of self locates in AMPS implementations can be estimated using the above Equation 13. The resultant estimated processor occupancy due to self locates is obtained by simply multiplying $\hat{l}_S$ by the processing time per self locate and a scaling factor to ensure that the result is expressed as a percentage.

Neighbor Locate Requests Received in AMPS

AMPS neighbor locate request processing may constitute a significant part of processor occupancy in AMPS and dual-mode cells As for self locates, the goal here is to express the number of neighbor locates $l_N$ as a function of the number of carried calls, ($\tilde{c}_A + h_{in,A}$). In estimating the number of neighbor locates $l_N$ the following conceptual problem initially appears. The number of neighbor locate requests received at a base station of interest depends on the number of self locates in each neighbor cell, which in turn, depends on ($\tilde{c}_A + h_{in,A}$) in those cells. However, the calling rates in a particular cell and its neighbors are highly correlated. Because self locates and calls in a cell were shown to be linearly related above, the number of self locates processed in each cell should also be highly correlated. Since a fraction of the self locates in a cell result in neighbor locate requests being sent, this implies that the number of neighbor locates received at a base station must be highly correlated with the number of self locates processed at that base station. Upon investigation of this correlation theory, it was discovered that the ratio $K_N$ of the number of neighbor locates received to the number of self locates processed was stable.

Figure 5:
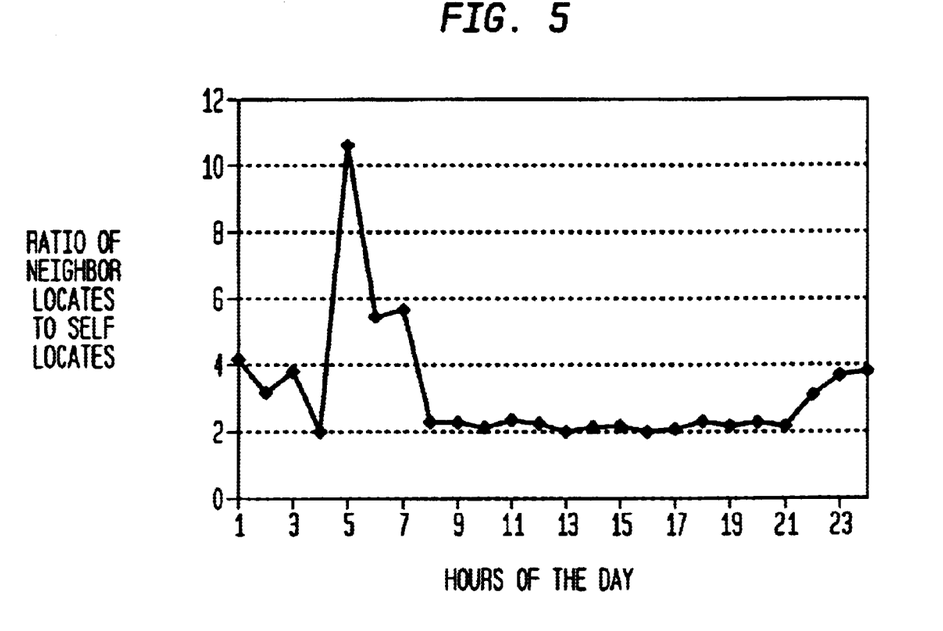
FIG. 5 illustrates a ratio of average number of neighbor locates to average number of self locates for a typical base station.

FIG. 5 illustrates a ratio of average number of neighbor locates to average number of self locates for a typical base station. As may be seen, this ratio $K_N$ remains approximately constant throughout the so-called "busy" part of the day in which processor occupancy is of interest. This indicates that the number of neighbor locates per self locate can be characterized by a cell specific constant, $K_N$, and utilized in the call capacity estimation model.

As for the number of self locates per call, the number of neighbor locates per self locate $K_N$ displays a wide spread, when viewed as an aggregate sample across base stations. The cause of this result is apparent, given that the number of neighbor locates received in each cell depends on the configuration and the choice of parameters at each neighbor. Since these parameters typically vary from cell to cell, $K_N$, also differs for different cells, and for the most accurate results it should be individually determined.

Expressing the above result mathematically, the estimated number of neighbor locates, $\hat{l}_N$, can be written in terms of the estimated number of self locates, $\hat{l}_S$, as:

$$\hat{l}_N = K_N \times \hat{l}_S = K_N \times K_S \times (\tilde{c}_A + h_{in,A}) \quad (14)$$

where the second equality follows from Equation 12. By using Equation 10 for $\hat{h}_{in,A}$ in place of $h_{in,A}$, $\hat{l}_N$ may be expressed as a function of $\tilde{c}_A$ or $c_{O,A}$ as follows:

$$\hat{l}_N = \frac{K_S K_N}{1 - K_{in,A} K_{out,A}} \tilde{c}_A = \frac{K_S K_N}{1 - K_{in,A} K_{out,A}} (1 + K_{term,A}) \times c_{O,A} \quad (15)$$

$K_N$ is cell-specific and must be determined through data analysis for the best accuracy. Through the analysis described above, $K_N$ may be computed for each cell, and hence the processor occupancy due to self locates in AMPS implementations can be estimated using the above Equation 15.

MAHO Locates in TDMA

Figure 6:
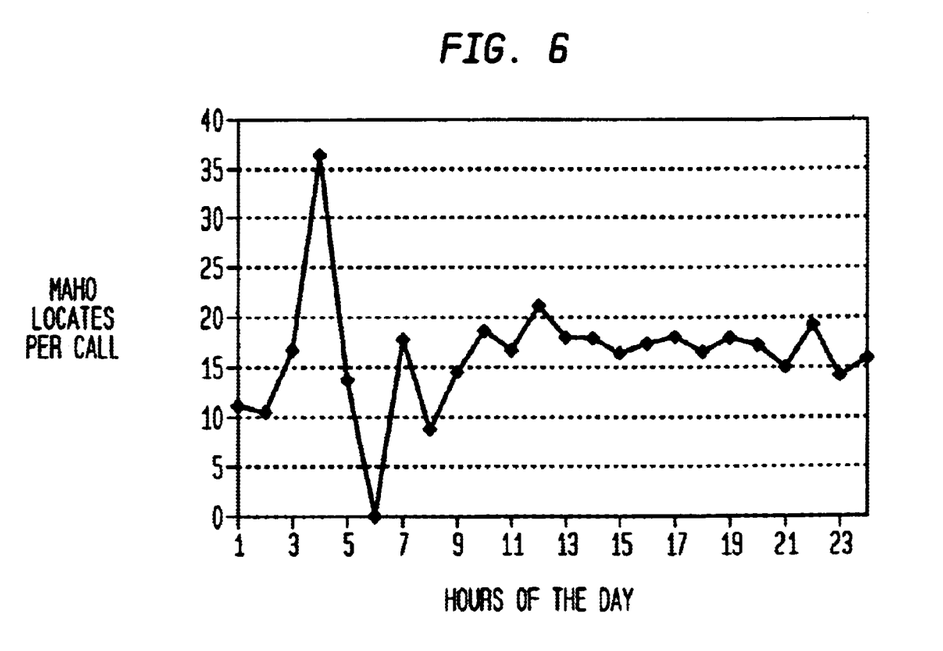
FIG. 6 illustrates an average number of mobile assisted handoff (MAHO) locates per call versus hour of day for a base station.

In IS-136 based TDMA systems, mobile units periodically measure signal strengths from neighboring base stations and report them back to their current base station. The measurements are processed by the base station and used in determining if the mobile unit needs to be handed off to a neighbor and, if so, to which base station (hence the term Mobile Assisted HandOff or MAHO). In terms of processor occupancy at the base stations, MAHO events in TDMA systems are analogous to the self-locates in AMPS systems. The number of MAHO locate triggers processed by the processor may be expressed as a function of the call load using the same approach outlined for AMPS self locates above. The average number of MAHO locate triggers processed per call was also found to be quite variable from cell to cell, but this ratio is reasonably stable for a chosen cell during the busy hours. FIG. 6 illustrates an average number of MAHO locates per call versus hour of day for a base station. The numbers of locates were averaged over one hour increments. Note that during the "busy" hours of 10 AM–10 PM, the number of MAHO locates per call does not vary significantly. Because the ratio of MAHO locates to the number of calls has been discovered to be approximately constant during the busy hours, the number of MAHO locates may be expressed as the product of a constant $K_M$ and the number of TDMA originations, terminations and incoming handoffs, $(\tilde{c}_T + h_{in,T})$, during the hour.

The estimated number of MAHO locates, $\hat{l}_M$ is given by:

$$\hat{l}_M = K_M \times (\tilde{c}_T + h_{in,T}) \quad (16)$$

$\hat{l}_M$ can be expressed as a function of $\tilde{c}_T$ or $c_{O,T}$ by substituting for $h_{in,T}$ using the TDMA version of Equation 10, as follows:

$$\hat{l}_M = \frac{K_M}{1 - K_{in,T} K_{out,T}} \tilde{c}_T = \frac{K_M}{1 - K_{in,T} K_{out,T}} (1 + K_{term,T}) \times c_{O,T} \quad (17)$$

Note that this expression is identical (except for the subscript T) to the Equation 13 for AMPS self locates above.

The second component of locate activity in TDMA is an activity analogous to neighbor locate in AMPS systems. Without repeating the analysis for this second TDMA locate capability, the approach would be the same as the one used above for AMPS neighbor locate activity.

Some important caveats about the above approaches for estimating the number of locates should be noted. The processor estimator equation is only valid for the system and base station configuration and parameter choices (e.g., threshold levels, etc.) used during data collection and analysis. If the configuration and/or some parameters are changed in a cell or any of its immediate neighbors, then, in general, the constants ($K_S$, $K_N$, etc.) will have to be recomputed to maintain the high accuracy of estimation and prediction.

In some instances, it may be possible to employ average values of both $K_S$ and $K_N$ (averaged over multiple cells), rather than cell-specific values. This alternate approach to processor occupancy and calling capacity estimation may acceptably trade off accuracy in estimation for simplicity in certain situations (e.g., forecasting the calling capacity of a cell to be deployed in an existing market). In essence, such an alternate approach allows prediction of calling capacity prior to deploying a cell, with some loss of prediction accuracy.

Paging and Registration

Much like handoffs and locates discussed above, the number of pages and registrations per hour also tend to be just a scalar multiple of the carried calls. The estimated number of pages and registrations per hour can be expressed as (shown here for AMPS)

$$\hat{p}_A = K_{P,A}(\tilde{c}_A + \tilde{h}_{in,A}) = \quad (18)$$
$$\frac{K_{P,A}}{1 - K_{in,A} K_{out,A}} \tilde{c}_A = \frac{K_{P,A}}{1 - K_{in,A} K_{out,A}} (1 + K_{term,A}) c_{O,A} \text{ and}$$

$$\hat{r}_A = K_{R,A}(\tilde{c}_A + \tilde{h}_{in,A}) = \quad (19)$$
$$\frac{K_{R,A}}{1 - K_{in,A} K_{out,A}} \tilde{c}_A = \frac{K_{R,A}}{1 - K_{in,A} K_{out,A}} (1 + K_{term,A}) c_{O,A},$$

respectively. Similar expressions can be obtained for estimates of TDMA pages and registrations $\hat{p}_T$ and $\hat{r}_T$, in terms of $\tilde{c}_T$ (or $c_{O,T}$).

Modified Processor Occupancy Estimator Equation

Using the development of handoff, locate, page and registration estimators in the preceding sections, a transformed processor occupancy estimator equation may now be written with only the number of originations+terminations, or the number of originations alone, as variables.

In doing so, it is useful to first define the following terms:

$\beta_{O,A(T)}$ is the processor processing time per AMPS (TDMA) call origination;

$\beta_{T,A(T)}$ is the processor processing time per AMPS (TDMA) call termination;

$\beta_{P,A(T)}$ is the processor processing time per AMPS (TDMA) page;

$\beta_{in,A(T)}$ is the processor processing time per incoming (target cell) AMPS (TDMA) handoff;

$\beta_{out,A(T)}$ is the processor processing time per outgoing (originating cell) AMPS (TDMA) handoff;

$\beta_{N,A(T)}$ is the processor processing time per AMPS (TDMA) neighbor locate request received;

$\beta_M$ is the processor processing time per TDMA MAHO locate trigger;

$\beta_S$ is the processor processing time per AMPS self locate trigger;

$\hat{\rho}_{i,A}$ is the estimated processor occupancy due to the $i^{th}$ AMPS call processing event. This is expressed as a percentage of time the processor is busy processing AMPS work load of type i. In the equations below, i is replaced with "L" for locates, "H" for handoffs, "P" for pages, "O+T" for originations+terminations;

$\hat{\rho}_{j,T}$ is the estimated processor occupancy due to the $j^{th}$ TDMA call processing event. This is expressed as a percentage of time the processor is busy processing TDMA work load of type j. In the equations below, j is treated similarly to i;

$\hat{\rho}_A$ is the total estimated processor occupancy due to AMPS call processing events;

$\hat{\rho}_T$ is the total estimated processor occupancy due to TDMA call processing events; and $\rho_{nl}$ is the no-load component of the processor occupancy.

In order to compute call capacity as the number of originations+terminations, the following approximation $\beta_{T,A(T)} \approx \beta_{O,A(T)}$ must hold. This is often a good approximation, because the processing times for originations and terminations are typically close to one another. If in some systems it is determined that this is not a good approximation, then call capacity must be computed as the number of originations (or terminations) alone.

In order to express occupancy as a function of just the number of originations, the number of terminations is expressed as a constant, $K_{term,A(T)}$, multiplied by the number of originations. See Equation 11. This approximation will further affect the estimates of processor occupancy due to handoffs and locates. The overall accuracy of the estimator will depend on how variable $K_{term,A(T)}$ is during the busy hours for a given cell.

In the equations that follow, the estimated processor occupancy due to each call processing event is expressed both as a function of the number of originations+terminations, $\tilde{c}_{A(T)}$, as well as the number of originations alone, $c_{O,A(T)}$. Because, for the data used, calling rates are per hour and processing times are in ms, the factor 36000 yields the estimate in %. If other units are used, the appropriate scaling factor would replace the factor 36000. The estimated processor occupancy (expressed as a percent of time) due to each AMPS call processing event is given by $\hat{\rho}_{O+T,A}=(\beta_{O,A}c_{O,A}+\beta_{T,A}c_{T,A})/36000 \approx C_{O+T,A} \times c_{O,A} \approx \tilde{C}_{O+T,A} \times \tilde{c}_A$ (originations+terminations) (20)

$\hat{\rho}_{L,A}=(\beta_S \hat{l}_S + \beta_N \hat{l}_N)/36000 \approx C_{L,A} \times c_{O,A} \approx \tilde{C}_{L,A} \times \tilde{c}_A$ (locates) (21)

$\hat{\rho}_{H,A}=(\beta_{in}\hat{h}_{in,A}+\beta_{out}\hat{h}_{out,A})/36000 \approx C_{ho,A} \times c_{O,A} \approx \tilde{C}_{ho,A} \times \tilde{c}_A$ (handoffs) (22)

$\hat{\rho}_{P,A}=\beta_{P,A}\hat{p}_A/36000 \approx C_{P,A} \times c_{O,A} \approx \tilde{C}_{P,A} \times \tilde{c}_A$ (pages) (23)

$\hat{\rho}_{R,A}=\beta_{R,A}\hat{r}_A/36000 \approx C_{R,A} \times c_{O,A} \approx \tilde{C}_{R,A} \times c_A$ (registrations) (24)

Using the $K_{term,A(T)}$ relation from Equation 11, and using the expressions for $\hat{h}_{in,A}$, $\hat{h}_{out,A}$, $\hat{l}_S$, $\hat{l}_N$, $\hat{p}$ and $\hat{r}$ from Equations 10, 13, 15, 18 and 19, respectively, the various constants C in Equations 20–24 may be expressed as follows.

$C_{O+T,A}=(\beta_{O,A}+\beta_{T,A}K_{term,A})/36000$ and $\tilde{C}_{O+T,A}=\beta_{O,A}/36000$ $$C_{L,A} = \left(\frac{\beta_S + \beta_N K_N}{1 - K_{in,A}K_{out,A}}\right)\left(\frac{K_S(1 + K_{term,A})}{36000}\right) \text{ and} \quad (25)$$

$$\tilde{C}_{L,A} = \left(\frac{\beta_S + \beta_N K_N}{1 - K_{in,A}K_{out,A}}\right)\frac{K_S}{36000}$$

$$C_{ho,A} = \left(\frac{\beta_{in,A}K_{in,A} + \beta_{out,A}}{1 - K_{in,A}K_{out,A}}\right)\left(\frac{K_{out,A}(1 + K_{term,A})}{36000}\right) \text{ and}$$

$$\tilde{C}_{ho,A} = \left(\frac{\beta_{in,A}K_{in,A} + \beta_{out,A}}{1 - K_{in,A}K_{out,A}}\right)\frac{K_{out,A}}{36000}$$

$$C_{P,A} = \beta_{P,A}\frac{K_{P,A}}{1 - K_{in,A}K_{out,A}}\frac{(1 + K_{term,A})}{36000} \text{ and}$$

$$\tilde{C}_{P,A} = \beta_{P,A}\frac{K_{P,A}}{1 - K_{in,A}K_{out,A}}\frac{1}{36000}$$

$$C_{R,A} = \beta_{R,A}\frac{K_{R,A}}{1 - K_{in,A}K_{out,A}}\frac{(1 + K_{term,A})}{36000} \text{ and}$$

$$\tilde{C}_{R,A} = \beta_{R,A}\frac{K_{R,A}}{1 - K_{in,A}K_{out,A}}\frac{1}{36000}$$

The estimated AMPS processor occupancy $\hat{\rho}_A$ is obtained by summing over the occupancy terms above (Eqns. 20–24) corresponding to originations+terminations, locates, handoffs and pages. As a function of just the originations, from Equations 20–24, the following processor occupancy expression is obtained:

$$\hat{\rho}_A = C_{tot,A} \times c_{O,A} \quad (26)$$

where $C_{tot,A}=C_{O+T,A}+C_{L,A}+C_{ho,A}+C_{P,A}+C_{R,A}$ from Equations 25.

Similarly, the estimated processor occupancy as a function of the number of originations+terminations is given by $$\hat{\rho}_A = \tilde{C}_{tot,A} \times \tilde{c}_A \quad (27)$$

where $\tilde{C}_{tot,A}=\tilde{C}_{O+T,A}+\tilde{C}_{L,A}+\tilde{C}_{ho,A}+\tilde{C}_{P,A}+\tilde{C}_{R,A}$ from Equations 25.

Having developed equations for the AMPS component of a dual mode system, corresponding TDMA equations will now be developed. For TDMA, the locate term is given by $$\hat{\rho}_{l,T} \approx C_{l,T} \times c_{O,T} \approx \tilde{C}_{l,T} \times \tilde{c}_T \quad (28)$$

Using the above $K_{term,A(T)}$ relation from Equation 11, and using the expressions for $l_M$ from Equation 17, the constants C in Equation 25 may be expressed as follows.

$$C_{l,T} = \beta_M \frac{K_M}{1 - K_{in,T}K_{out,T}}(1 + K_{term,T})/36000 \quad (29)$$

$$\tilde{C}_{l,T} = \beta_M \frac{K_M}{1 - K_{in}K_{out}}/36000 \quad (30)$$

Corresponding terms for TDMA originations, terminations, handoffs, pages and registrations have the same form as the AMPS terms above (see Eqns. 20–24), with the appropriate TDMA constants in place of the AMPS constants. The estimated TDMA contribution to processor occupancy as a function of originations is then written as:

$$\hat{\rho}_T = C_{tot,T} \times c_{O,T} \quad (31)$$

where $C_{tot,T}=C_{O+T,T}+C_{l,T}+C_{ho,T}+C_{P,T}+C_{R,T}$.

As a function of the number of originations+terminations and pages, the processor occupancy is written as $$\hat{\rho}_T = \tilde{C}_{tot,T} \times \tilde{c}_T \qquad (32)$$

where $\tilde{C}_{tot,T} = \tilde{C}_{O+T,T} + \tilde{C}_{l,T} + \tilde{C}_{ho,T} + \tilde{C}_{P,T} + \tilde{C}_{R,T}$.

For dual-mode AMPS and TDMA base stations the processor occupancy estimate is $$\hat{\rho} = \hat{\rho}_A + \hat{\rho}_T + \hat{\rho}_{nl} \qquad (33)$$

For single mode base stations (i.e., AMPS only or TDMA only), the processor occupancy term due to the other mode is zero in Equation 33.

Figure 7:
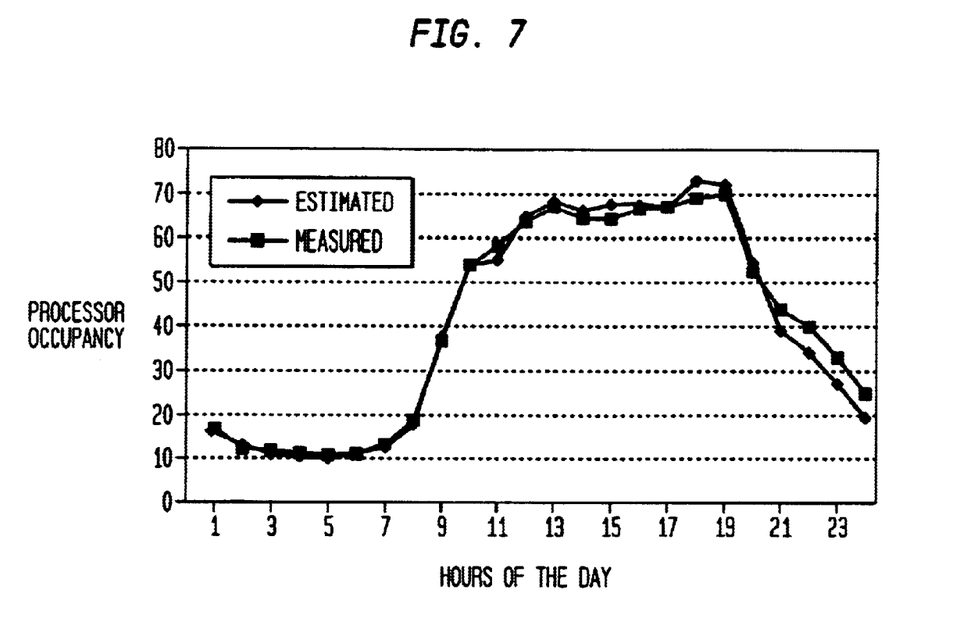
FIG. 7 illustrates an estimated and measured processor occupancy for a cell, the estimated values based on the modified estimator equation with only originations and terminations as variables.

The transformed estimation Equation 33, which is only a function of originations+terminations $\tilde{c}_{A(T)}$ was compared to measured values from field data to evaluate the accuracy of this transformed estimator. FIG. 7 illustrates an estimated and measured processor occupancy for a cell, the estimated values based on the modified estimator equation with only originations and terminations as variables. The measured processor occupancy was obtained from measured counts.

The inputs to this transformed estimation equation are the AMPS and TDMA calling rates ($\tilde{c}_A$, $\tilde{c}_T$) and the cell specific constants ($C_{tot,A}$, $C_{tot,T}$, $P_{max,A}$, $P_{max,T}$, $\rho_{nl}$). The constants $C_{tot,A(T)}$ are in turn functions of other constants ($K_S$, $K_N$, etc.) determined through data analysis of measured counts for the base station of interest. The agreement observed during the busy hours is quite good. This result validates the accuracy of the transformed estimation equation which is used for calling capacity computation in Equations 6 and 8.

It will be appreciated that the above equations and relationships are suitable for incorporation into a computer program. Such a program is supplied with field data (i.e., counts) from a base station in the form of, for example, a spreadsheet file. The program then identifies the calling event types present in the data file, and computes the ratios among calling events outlined in Equations 9–33. The computer program then computes processor occupancy, and plots the various ratios and occupancies, shown for example in FIGS. 2–7.

Though the above description discussed AMPS and TDMA systems and implementations, the present invention is applicable to, and is intended to encompass, other mobile communication systems such as Code Division Multiple Access (CDMA) and Global System for Mobile Communications (GSM).

It will be apparent to those skilled in the art that various modifications and variations can be made in the enclosure and method of manufacturing of the present invention without departing from the spirit or scope of the invention. Thus, it is intended that the present invention cover the modifications and variations of this invention provided that they come within the scope of the appended claims and their equivalents.

What is claimed is:

1. A method for determining a capacity of a base station, comprising:
    measuring rates of a plurality of call processing events in a base station;
    determining constant ratios among call processing event rates for the base station based on the measured rates; and
    defining an equation for processor occupancy depending on a call origination rate or a call origination plus call termination rate using the determined constant ratios.

2. The method of claim 1, further comprising:
    predicting processor occupancy by
        fixing the call origination rate or the call origination plus call termination rate; and
        calculating the processor occupancy of the base station from the equation and the fixed call origination rate or a call origination plus call termination rate.

3. The method of claim 1, further comprising:
    predicting calling capacity by
        fixing the processor occupancy; and
        calculating the call origination rate or the call origination plus call termination rate of the base station from the equation and the fixed processor occupancy.

4. The method of claim 1, wherein the determining step determines constant ratios for at least one of AMPS call processing events and TDMA call processing events.

5. The method of claim 1, wherein the determining step includes
    calculating a ratio between a handoff rate and either the call origination rate or the call origination plus call termination rate of the base station.

6. The method of claim 1, wherein the determining step includes
    calculating a ratio between a locate rate and either the call origination rate or the call origination plus call termination rate of the base station.

7. The method of claim 1, wherein the determining step includes
    calculating a ratio between a paging rate and either the call origination rate or the call origination plus call termination rate of the base station.

8. The method of claim 1, wherein the determining step includes
    calculating a ratio between a registration rate and either the call origination rate or the call origination plus call termination rate of the base station.

9. The method of claim 1, further comprising:
    determining a constant term in the processor occupancy equation corresponding to time spent on tasks not related to call processing.

10. A method for determining a parameter of a base station, comprising:
    measuring rates of a plurality of call processing events in a base station; and
    determining a constant ratio between one of a handoff rate, a paging rate, a registration rate and a locate rate, and one of a call origination rate and a call origination plus call termination rate based on the measured rates.

11. The method of claim 10, further comprising:
    predicting the handoff rate based on the determined constant ratio and one of a fixed call origination rate and a fixed call origination plus call termination rate.

12. The method of claim 10, further comprising:
    predicting one of the call origination rate and the call origination plus call termination rate based on a fixed handoff rate and the determined constant ratio.

13. The method of claim 10, further comprising:
    predicting the locate rate based on the determined constant ratio and one of a fixed call origination rate and a fixed call origination plus call termination rate.

14. The method of claim 10, further comprising:
    predicting one of the call origination rate and the call origination plus call termination rate based on a fixed locate rate and the determined constant ratio.

15. The method of claim 10, further comprising:

predicting the paging rate based on the determined constant ratio and one of a fixed call origination rate and a fixed call origination plus call termination rate.

16. The method of claim 10, further comprising:

predicting one of the call origination rate and the call origination plus call termination rate based on a fixed paging rate and the determined constant ratio.

17. The method of claim 10, further comprising:

predicting the registration rate based the determined constant ratio and one of a fixed call origination rate and a fixed call origination plus call termination rate.

18. The method of claim 10, further comprising:

predicting one of the call origination rate and the call origination plus call termination rate based on a fixed registration rate and the determined constant ratio.

19. A method for determining a capacity of a base station, comprising:

measuring rates of a plurality of call processing events in a base station; and determining constant ratios among the plurality of call processing event rates and a calling rate.

20. The method of claim 19, further comprising:

calculating a processor occupancy of the base station using the determined constant ratios and a predetermined calling rate.

21. The method of claim 19, further comprising:

calculating a calling capacity of the base station using the determined constant ratios and a predetermined processor occupancy.

* * * * *